US005537212A

United States Patent [19]

Kelly et al.

[11] Patent Number: 5,537,212

[45] Date of Patent: Jul. 16, 1996

[54] METHOD AND APPARATUS FOR SENSING THE COLOR OF AN OBJECT

[75] Inventors: Bryan M. Kelly, Dublin; John J. Goodman, Pacheco, both of Calif.

[73] Assignee: Lazer-Tron Corporation, Pleasanton, Calif.

[21] Appl. No.: 135,635

[22] Filed: Oct. 12, 1993

[51] Int. Cl.$^6$ .......... G01N 21/25

[52] U.S. Cl. .......... 356/406; 250/226

[58] Field of Search .......... 356/402, 407; 358/75, 76, 116; 250/208.1, 226; 348/188, 191

[56] References Cited

U.S. PATENT DOCUMENTS

| | | | |
|---|---|---|---|
| 2,700,546 | 1/1955 | Glassen, Jr. . | |
| 2,977,429 | 3/1961 | Zimmerman . | |
| 3,451,680 | 6/1969 | Koleske . | |
| 4,140,220 | 2/1979 | Hazeltine et al. | 356/407 X |
| 4,533,141 | 8/1985 | Foley et al. | 273/86 C |
| 4,558,357 | 12/1985 | Nakagawa et al. | 358/75 |
| 4,917,500 | 4/1990 | Lugos | 356/406 |
| 4,927,160 | 5/1990 | Nichol et al. | 273/371 |
| 4,956,775 | 9/1990 | Klamer et al. | 364/411 |
| 5,021,645 | 6/1991 | Satula et al. | 250/223 R |
| 5,049,985 | 9/1991 | Outa | 358/76 |
| 5,299,275 | 3/1994 | Jackson et al. | 385/116 |

FOREIGN PATENT DOCUMENTS

| | | | |
|---|---|---|---|
| 0204427 | 12/1982 | Japan | 356/407 |
| 0201327 | 9/1987 | Japan | 356/402 |

*Primary Examiner*—Vincent P. McGraw
*Assistant Examiner*—K. P. Hantis
*Attorney, Agent, or Firm*—Hickman Beyer & Weaver

[57] ABSTRACT

A light guide receives light reflected from an object, such as a moving ball in a game, and directs the light to a charge coupled device. Light sensitive pixels of the charge coupled device detect the intensities of red, green, and blue wavelengths and provides intensity levels to an averager which averages the intensities. Ratios between the red, green, and blue digital signal intensities are compared to determine the predominant color in the guided light and hence the predominant color of the object. Multiple light guides can be used to sense the color of objects, where each light guide can direct light to a different subset of pixels on the charge coupled device.

30 Claims, 9 Drawing Sheets

METHOD AND APPARATUS FOR SENSING THE COLOR OF AN OBJECT

BACKGROUND OF THE INVENTION

1. Field of the Invention

This invention relates to games normally played in an arcade environment, and more particularly to such games played by directing a playing piece into one or more targets, and to color sensing apparatus used in games.

2. Background of the Related Art

Games of many types are played in arcade environments. One type of game utilizes a target and a playing piece that moves relative to the target. A game score is accumulated based upon characteristics of the playing pieces (e.g. shade, color, etc.) and whether they reach the target.

An example of one such arcade game is found in U.S. Pat. No. 4,956,775, of Klamer et al., who describes a game in which a photosensor and an LED are mounted on the rim of a basketball hoop to sense whether a darkly-colored ball or a lightly-colored ball has passed through the hoop; score is separately kept for each of the two different shades of ball. Another example is found in U.S. Pat. No. 4,533,141, of Foley et al., who describe a game in which a number of marbles are rolled down a series of inclined planes that have randomizing obstructions. The order in which the marbles reach the bottom is detected by a color-sensitive detector which senses the colors of the marbles. Yet another example is found in U.S. Pat. No. 2,700,546, of H. Glassen, Jr., who describes a game in which a coin is tossed onto a contact ring on a playing field in synchronization with the blinking of colored lights on a separate display panel.

Various types of sensors are used to determine the shade or color of playing pieces for games. Also, shade and color sensors are known in the prior art for a variety of other purposes. For example, U.S Pat. No. 4,917,500, of A. Lugos, describes a color sensor system for the recognition of objects with colored surfaces using an active device where at least three electronic light transmitters are used to successively illuminate a colored surface of an object to determine its color. U.S. Pat. No. 5,021,645, by Satula er al., describes a photo-electric color sensor for article sorting utilizing a number of light sources of different wavelengths in conjunction with a photosensitive element to determine the color of a target object.

Games of the prior art, while enjoyable, tend to be simplistic and, as such, can lead to rapid player boredom. This is undesirable in an arcade environment where revenues are directly related to the continuous, repeated use of the games. It is contemplated that an arcade game which makes sophisticated use of color sensing to control and/or enhance the game experience would remain more interesting to players and generate greater revenues for the arcade owner.

SUMMARY OF INVENTION

The present invention provides an arcade game and method for playing an arcade game which makes substantial use of color recognition to control and enhance the game experience. The arcade game comprises a number of playing pieces and a number of targets receptive to the playing pieces. The playing pieces and targets are associated with distinct colors. A playing piece having a certain color is preferably tossed by a player into a highlighted target of the same color to score points. These improvements add excitement and complexity to the game, which tends to prolong player involvement.

An embodiment of the game apparatus of the present invention includes a number of playing pieces, each playing piece having a distinct color; a number of targets being receptive to the playing pieces, each target being associated with at least one of the distinct colors; a sensor mechanism arranged to detect the color of a playing piece received by a designated target; and a coring apparatus for changing a game score when the color associated with a playing piece that has been received by a designated target matches a color associated with the designated target.

The targets of the invention can preferably be highlighted for a predetermined period of time, and the scoring apparatus preferably changes the game score when the color of a playing piece received by a highlighted target matches a color of the highlighted target. A variation of the game apparatus includes a processing apparatus for determining the color of a playing piece received by a target. The sensors preferably include a charge coupled device for detecting the color of playing pieces directed into the targets.

The playing pieces are preferably tossed into a highlighted target by a player. The playing pieces are preferably substantially spherical, and the targets are preferably funnel-shaped. After being received by a target, a playing piece is preferably guided to a dispenser area by a return mechanism and can be used by the player again. A variation of the game includes a timer operative to stop the scoring apparatus from changing the game score after a predetermined period of game time has expired, and also preferably prevents the player from using the playing pieces after game time has expired. A further variation of the game includes an award dispenser, which dispenses an award based upon the game score.

The game apparatus according to the present invention includes a number of targets operative to sense the color of playing pieces directed into them that adds complexity and interest to an otherwise simple tossing game. This again increases player involvement with the game and increases the revenue produced by the game.

A color sensing apparatus of the present invention includes a charge coupled device (CCD) including a plurality of color sensitive pixels, a fiber optic cable having a first end adjacent to an object and a second end adjacent to the color sensitive pixels, and a digital computation device coupled to the CCD for determining the predominant color of the object. The digital computation device compares the relative average intensities of the primary colors reflected by the object to determine the object's predominant color.

A method for determining color in accordance with the present invention senses the light reflected from an object with a plurality of color sensitive pixels, calculating the average R, G, and B intensity from at least a subset of the pixels, and comparing the R, G, and B intensities to determine a predominant color of the object.

These and other advantages of the present invention will become apparent to those skilled in the art after reading the following descriptions and studying the various figures of the drawings.

DETAILED DESCRIPTION OF THE PREFERRED EMBODIMENTS

Figure 1:
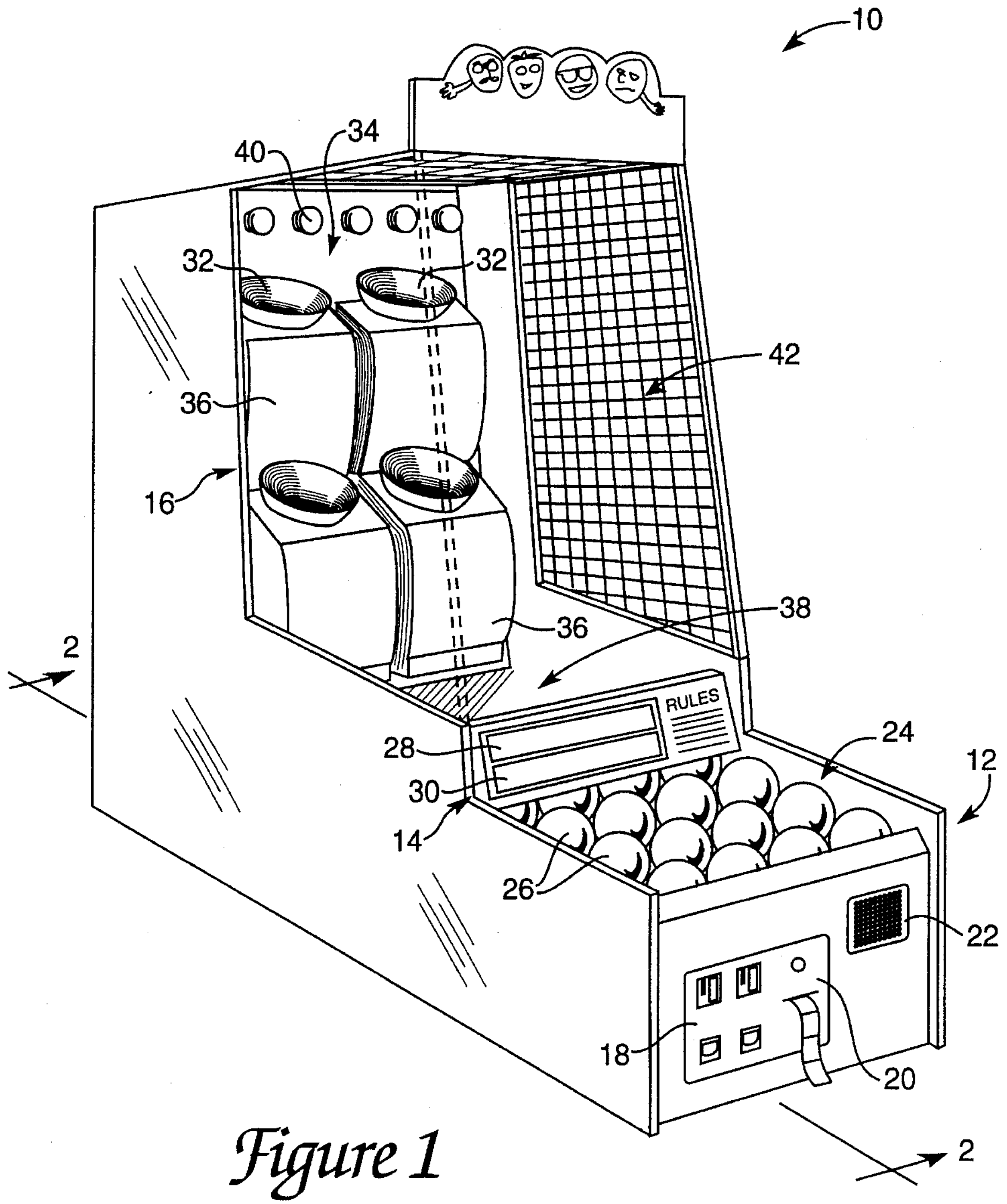
FIG. 1 is a perspective view of a game apparatus of the present invention.

FIG. 1 is a perspective view of a game apparatus in accordance with the present invention. The game apparatus 10 includes a front panel section 12, a display section 14, and a target section 16.

The front panel section 12 includes a coin deposit slot 18, a ticket dispenser 20, a speaker 22, and a playing piece dispenser 24. The coin deposit slot 18 may accept standard currency coins or game tokens that are often available in an arcade environment. Coins deposited in coin deposit slot 18 are stored in a coin box positioned behind the front panel section 12.

Ticket dispenser 22 preferably dispenses a ticket award to the player based upon a game score. In this present embodiment, tickets may be accumulated to win various prizes Other types of awards besides tickets may be chosen by the game owner; for example, baseball or other sports cards can be dispensed, or even coins or currency. Ticket dispensing mechanisms are well-known in the prior art. The awards are stored in a storage area behind the front panel 12 which is described in more detail with reference to FIG. 2.

The speaker 24 emits sounds based on game actions and other game states and is controlled by the game unit controller system. The operation of the speaker will be discussed in greater detail subsequently.

Playing piece dispenser 24 provides a number of playing pieces 26 for the player's use. A playing piece return apparatus which returns a playing piece to the playing piece dispenser 24 after a playing piece has been used is detailed with reference to FIG. 2. In the preferred embodiment, playing pieces 26 are balls, each having a distinct color; for example, the bails can be orange, yellow, red, and green. Preferably, the balls have one of a predetermined number of colors. However, the shades of the predetermined colors are not exact, and the game can operate with a range of shades (see FIG. 5). In the preferred embodiment, 20–30 balls 26 are stored in the dispenser 24 and are available for use by the player. In an alternate embodiment, playing pieces with differing physical attributes other than color are used. For example, balls of differing sizes can be used; or, playing pieces with different shapes, such as cubes, pyramids, etc., can be used.

A player of game apparatus 10 inserts a coin into coin slot 18, which causes a ball gate (shown in FIG. 2) to open and allows bails 26 to roll into playing piece dispenser 24. The player picks up a ball 26 from playing piece dispenser 24 and tosses the playing piece 26 at the target section 16 to direct the ball into a target ( described subsequently).

The display section 14 includes a game score display 28 and a time display 30. The game score display 28 is preferably an LED display that indicates a game score to the player. Time display 30 is also preferably an LED display that indicates the time remaining in the game. In the preferred embodiment, once the time counts clown to zero, a game is over. In an alternate embodiment, the time display is used for game variations between two or more players. For example, a first player can play the game for a specified period of time, followed by a second player who plays for the same amount of time, and so on.

Target section 16 includes a number of individual targets 32 which are positioned near back wall 34 of the game apparatus 10. Targets 32 are positioned to receive bails 26 that have been tossed by the player. Targets 32 are preferably funnel-shaped having openings with diameters that are about 3–4 times the diameter of a ball. Target displays 36 support targets 32 and preferably display a color corresponding to a specific ball color. For example, if bails 26 are orange, red, yellow, and green, then each of four target displays 36 would display one of those colors. During game play, a player can score points by tossing a ball 26 into a target 32 whose display 36 has a color matching the color of the tossed ball 26. In an alternate embodiment, a target display 36 displays two or more colors. In such an embodiment, a ball having one of the colors displayed by the target can be directed into that target 32 to score points at various times in the game. Target displays 36 can also be highlighted to draw a player's attention to a specific target (explained with reference to FIG. 3).

In the preferred embodiment, an opening 38 is provided between playing piece dispenser 24 and target section 16. Balls 26 that are tossed with insufficient force to hit targets 32 or balls that bounce off target displays 36 or back wall 34 fall into opening 38 and roll back to playing piece dispenser 24.

Lights 40 are preferably provided on back wall 34 and other areas of game apparatus 10 to decorate and enhance game play. Screen 42 preferably extends along the sides of the game apparatus 10 to prevent tossed balls 26 from exiting the boundaries of game apparatus 10.

Figure 2:
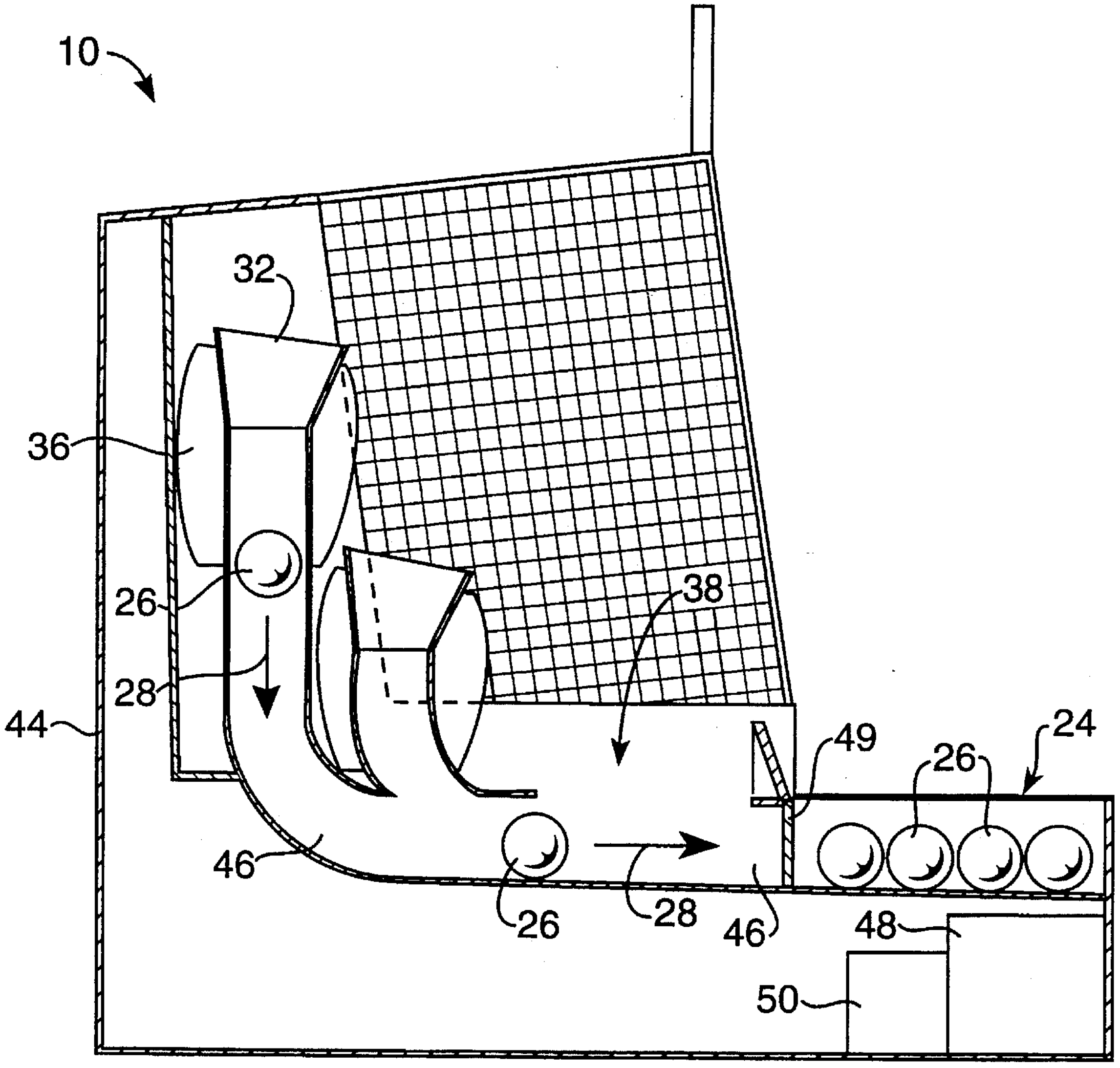
FIG. 2 is a partial side cross-sectional view taken along line 2—2 of FIG. 1.

FIG. 2 is a cross-sectional view of the game apparatus 10. Game cabinet 44 supports the target section 16, display section 14, and front panel 12. Bails 26 are provided in playing piece dispenser 24 to be picked up by the player and tossed towards target section 16. A ball 26 that fails into a target 32 is detected by a sensor located within the target 32 (detailed with reference to FIG. 3). The tossed ball 26 travels through passage 46 as indicated by arrows 28 and stops rolling at playing piece dispenser 24. Balls 26 that fall through opening 38 stop at the bottom of passage 46 and also roll to dispenser 24. Preferably, after a predetermined period of time has elapsed, a gate 49 is closed and blocks any balls 26 from rolling into playing piece dispenser 24. Once gate 49 closes, balls 26 are stored in passage 46. When another coin is inserted into coin slot 18, gate 49 opens and allows balls 26 to roll to dispenser 24. Ball gate 49 is preferably controlled by a control system (detailed with reference to FIG. 5) which activates solenoids to open and close the gate.

Award dispenser box 48 is positioned close to front panel 12. Awards dispensed by the ticket dispenser 22 are preferably stored in the box 48. Coin box 50 stores coins deposited into coin slot 18. Coin boxes suitable for use in game apparatus 10 are readily available on the commercial market.

Figure 3:
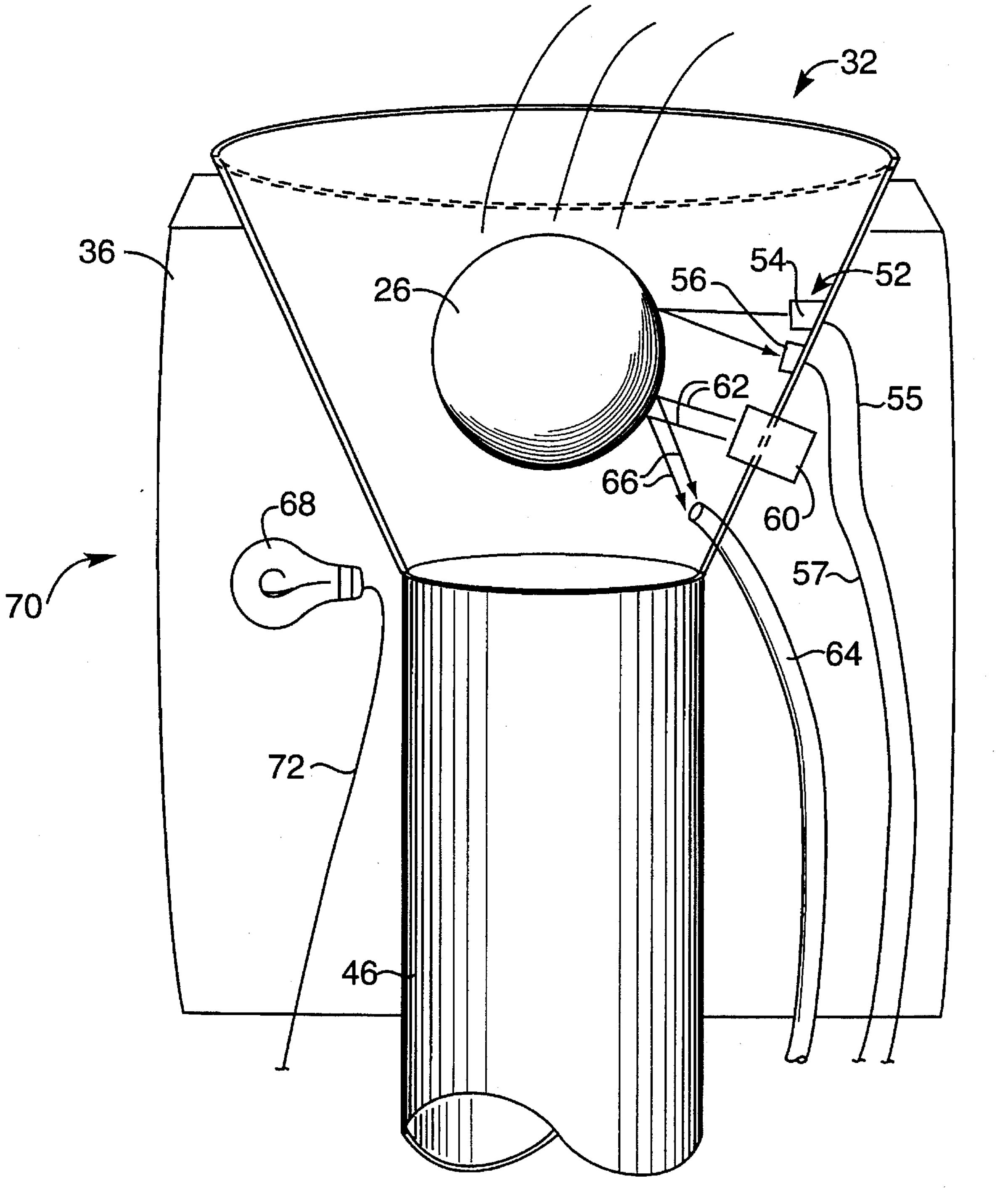
FIG. 3 is a side elevational view of target and sensor of the present invention.

FIG. 3 is a detailed view of a target 32 and target display 36. Target 32 is preferably a funnel-shaped opening receptive to a ball 26 tossed by a player. Target 32 preferably includes a sensor 52 positioned in the interior and on one side of the funnel. Sensor 52 is preferably an optoelectronic sensor and includes an emitter 54 and a detector 56. Emitter 54 emits electromagnetic radiation, such as infrared light, in pulses of a predetermined frequency. The radiation is pulsed at a particular frequency to distinguish it from ambient light and other sources of interference radiation that may be present. The pulse frequency of the emitted radiation is controlled by a control system (see FIG. 5) coupled to emitter 54 by a wire 55. Detector 56 is able to detect the electromagnetic radiation emitted by emitter 54. Preferably, emitter 54 is positioned such that the emitted radiation is directed away from detector 56 and is only reflected back to detector 56 when an object, such as a ball 26, falls into the target 32. In this manner, detector 56 will detect radiation emitted from emitter 54 only when a ball 26 falls into the target. Detector 56 transmits a signal on line 57 to the control system of the game apparatus when it detects electromagnetic radiation. Alternatively, other target types and sensor technologies can be equivalently substituted.

In other embodiments, different types of sensors 52 can be used. For example, a switch positioned in target 32 can detect the passage of a playing piece 26 if the playing piece contacts the switch.

Target 32 also includes a light source 60 preferably positioned near the bottom of the funnel. Light source 60 transmits a light beam 62 across the interior of target 32 in such a way that an object failing into the funnel will block and reflect the light beam 62. Light source 60 preferably transmits white visible light that includes most of the wavelengths of visible light (about 400 nm to about 700 nm).

Light guide 64 is also preferably positioned within target 32 below light source 60. In the preferred embodiment, guide 64 is a fiber optic cable. If ball 26 fails into target 32, guide 64 receives light from light source 60 that has been reflected from the surface of ball 26. Reflected light 66 is introduced in guide 64 and is transmitted preferably through the fiber optic cable to a sensor device (detailed with respect to FIGS. 4 and 4*a*). Ball 26 continues to fall through target 32 to passage 46, which guides the ball 26 toward the playing piece dispenser as detailed with reference to FIG. 2.

Target display 36 supports target 32. Highlighting source 68 is positioned behind front panel 70 of target display 36. Highlighting source 68 is preferably a standard light bulb and is coupled to the control system (detailed subsequently) by a wire 72. The control system activates highlighting source 68 to highlight target 32 at selected times. Preferably, highlighting source is activated according to a pattern such that a single target display 36 is highlighted for a predetermined time interval, after which a different selected target display 36 is highlighted in a similar manner. In an alternate embodiment, target displays 36 are highlighted in a random fashion. In another embodiment, two or more target displays are highlighted concurrently.

Front panel 70 of target display 36 is preferably made of a translucent material, such as translucent plastic, so that light beams from highlighting source 68 can travel through front panel 70 and a player can view the highlighted target display 36. Front panel 70 preferably has a color corresponding to one of the colors that are associated with balls 26. Alternatively, front panel 70 can include two or more colors that correspond to the colors associated with balls 26.

Figure 4:
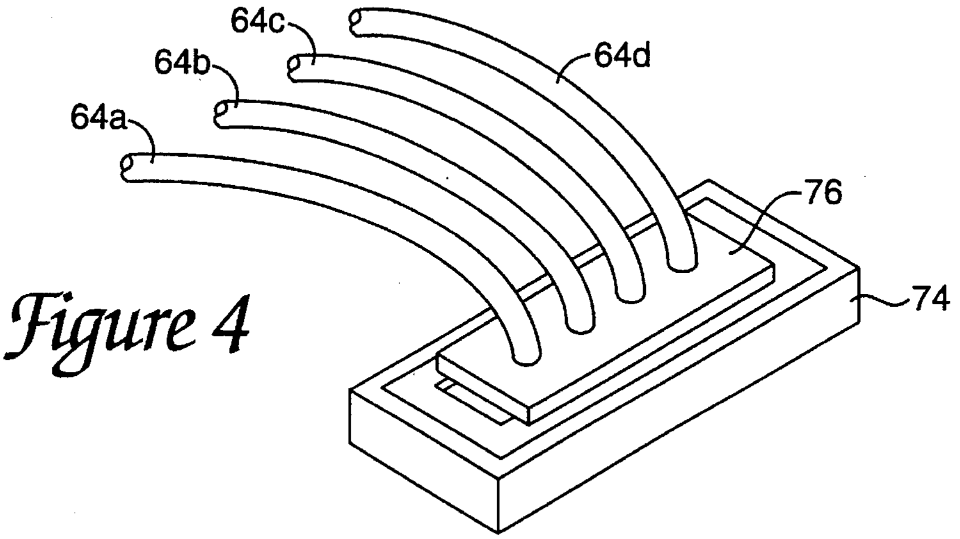
FIG. 4 is a perspective view of a preferred sensor device of the present invention.
Figure 4A:
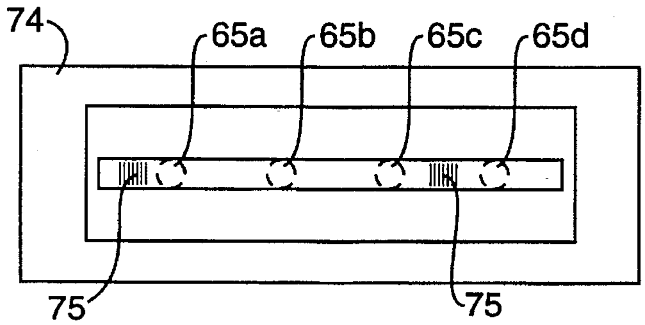
FIG. 4*a* is a top plan view of the sensor device.

FIG. 4 is a perspective view of a sensor device 74 and guides 64 used in the preferred embodiment. FIG. **4*a* is a top plan view of the sensor device 74 alone. Light guides 64*a–d* are preferably lengths of fiber optic cable, each coupled to a target 32 on one end of the cable (not shown). The other ends of the cables are coupled to a sensor device 74. The spot of light made by the fiber optic cables on the pixels 75 of sensor device 74 are indicated by areas 65*a*–65*d*, respectively. Each of light guides 64*a–d* is coupled to a target 32 associated with a different color used in the game. For example, guide 64*a* can be coupled to a target associated with the color red, guide 64*b* can be coupled to a target associated with the color yellow, and so on for all the colors of balls 26** used in the game.

In the preferred embodiment, guides **64*a–d* are secured to sensor device 74 by a plastic mounting block 76. Sensor device 74 is preferably a charge coupled device (CCD), such as the TCD136C-2 integrated circuit manufactured by Toshiba of Japan. Sensor device 74 senses the red, green, and blue wavelength components in a sample of light directed at several photosensitive elements positioned on the device 74. For example, the TCD136C-2 CCD includes 1560 photosensitive elements arranged linearly along the top surface of the device 74. Every three elements includes a red, green, and blue sensor, so that 520 red-green-blue (RGB) elements are linearly arranged on the device. Each light guide 64*a–d* is mounted directly above several of these RGB elements by mounting block 76. In the preferred embodiment, each end of guides 64*a–d* is positioned over 12 single elements (i.e. 4 RGB elements). The end of guide 64*a* is positioned over elements numbered 64 through 80 at area 65*a*. The end of next adjacent guide 64*b* is similarly positioned over 12 single elements numbered 520 to 531 at area 65*b*. The remaining guides 64 are positioned similarly over 12 single elements with about 494 single "dummy" elements in between each guide. Several dummy elements are used in between each guide to allow time to process the data output by the CCD (described with reference to FIG. 5** ).

In the preferred embodiment, one of light guides **64*a–d* transmits light reflected from a ball 26 that has entered a target 32. This reflected light impinges on the RGB elements of sensor device 74. Sensor device 74 outputs a serial signal representative of the RGB levels of the light reflected from ball 26** (detailed subsequently).

FIG. **4*b* is a graph 77 showing the spectral response of the CCD sensor device 74** used in the preferred embodiment of the invention. The wavelengths of blue, green, and red components of light are shown versus the relative response of the CCD to these color components. The CCD is most sensitive to red wavelengths, followed by green wavelengths and finally blue wavelengths.

The information embodied in graph 77 can be used to mathematically adjust the signals received from the CCD so that all colors are be normalized with respect to an arbitrary wavelength, e.g. the blue wavelengths, which usually provide the weakest signals. In this manner, all colors will be treated equally. In other words, this normalization process allows the color detection system to be equally sensitive to all bails, regardless of their color.

Figure 5A:
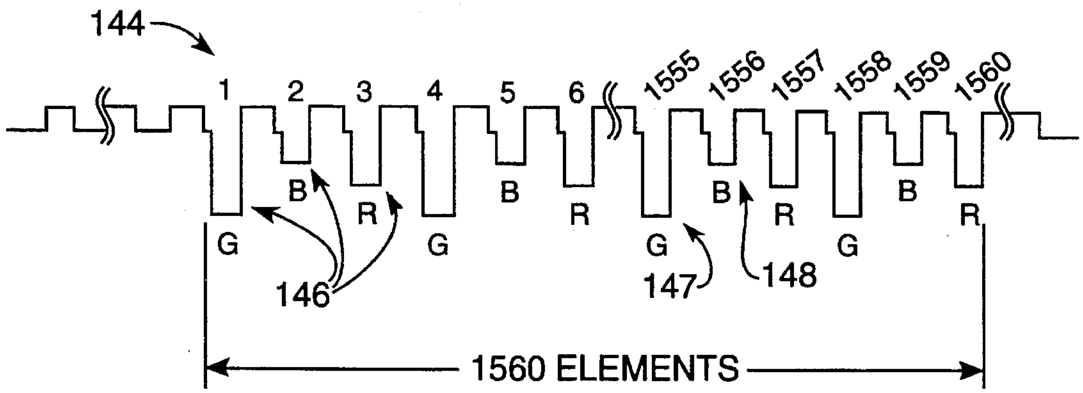
FIG. 5*a* is a schematic view of the output signal from a sensor device of the present invention.
Figure 4B:
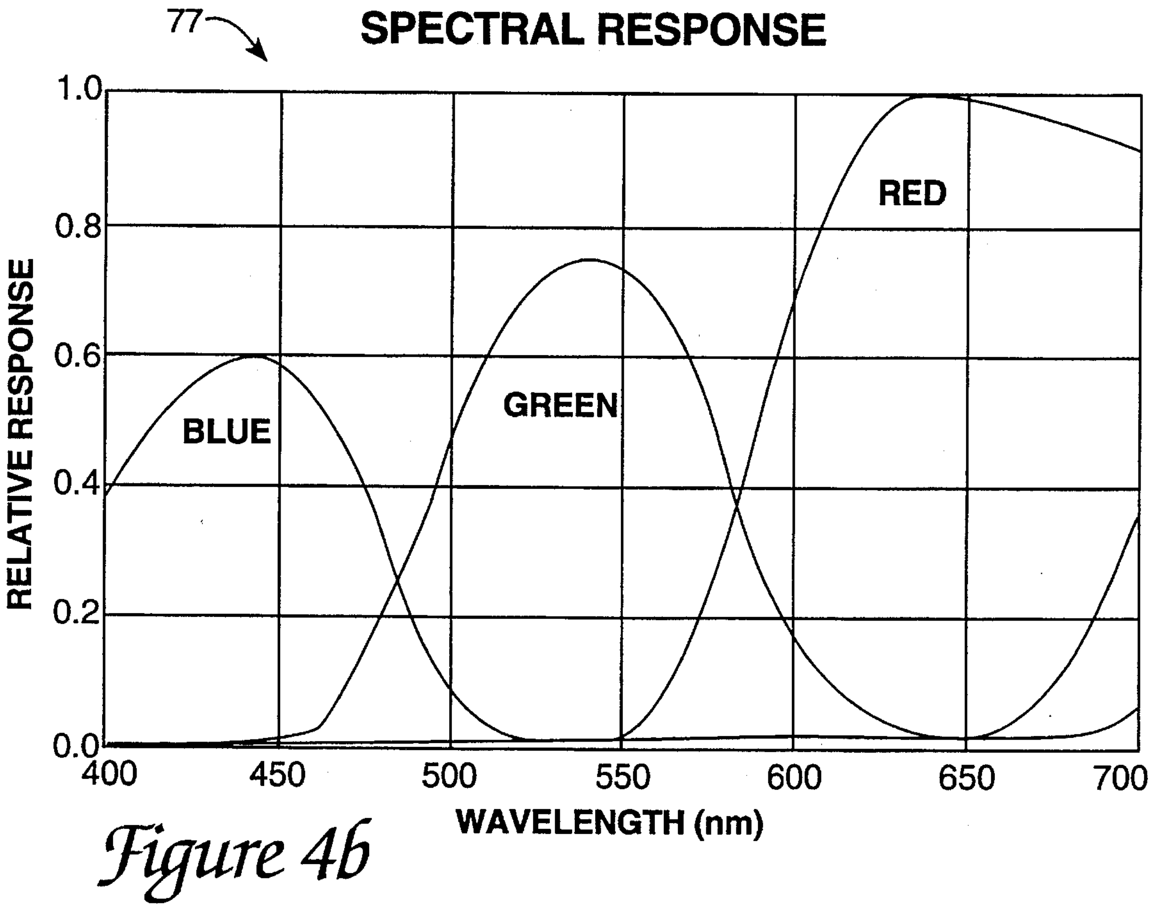
FIG. 4*b* is a graph showing the spectral response of the sensor device used in the preferred embodiment of the invention.
Figure 5B:
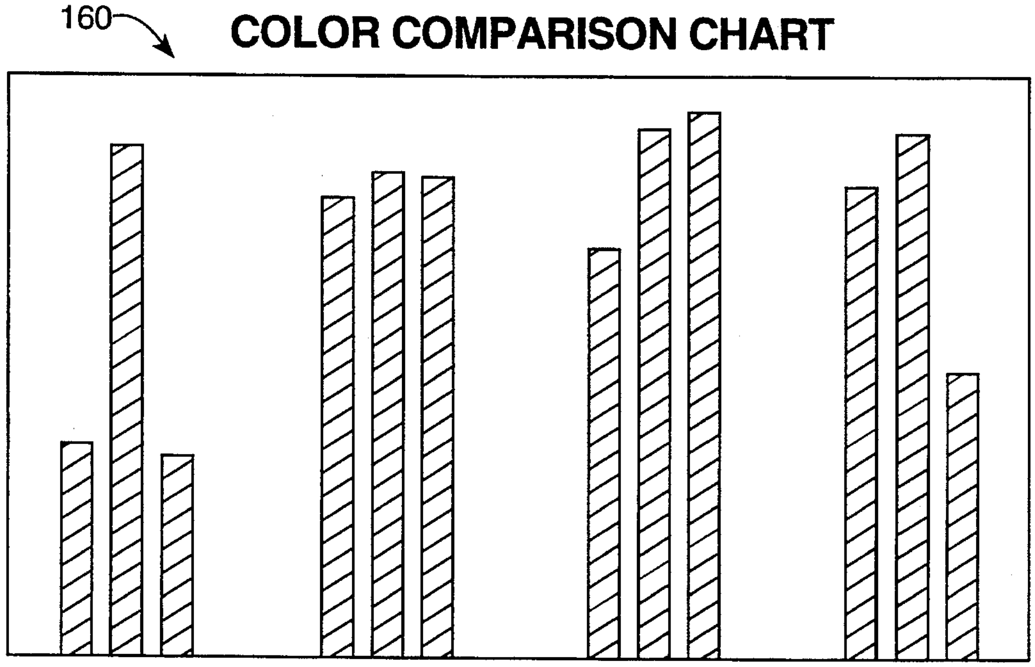
FIG. 5*b* is a graph showing the component signals of different colors recognized in the game.
Figure 5:
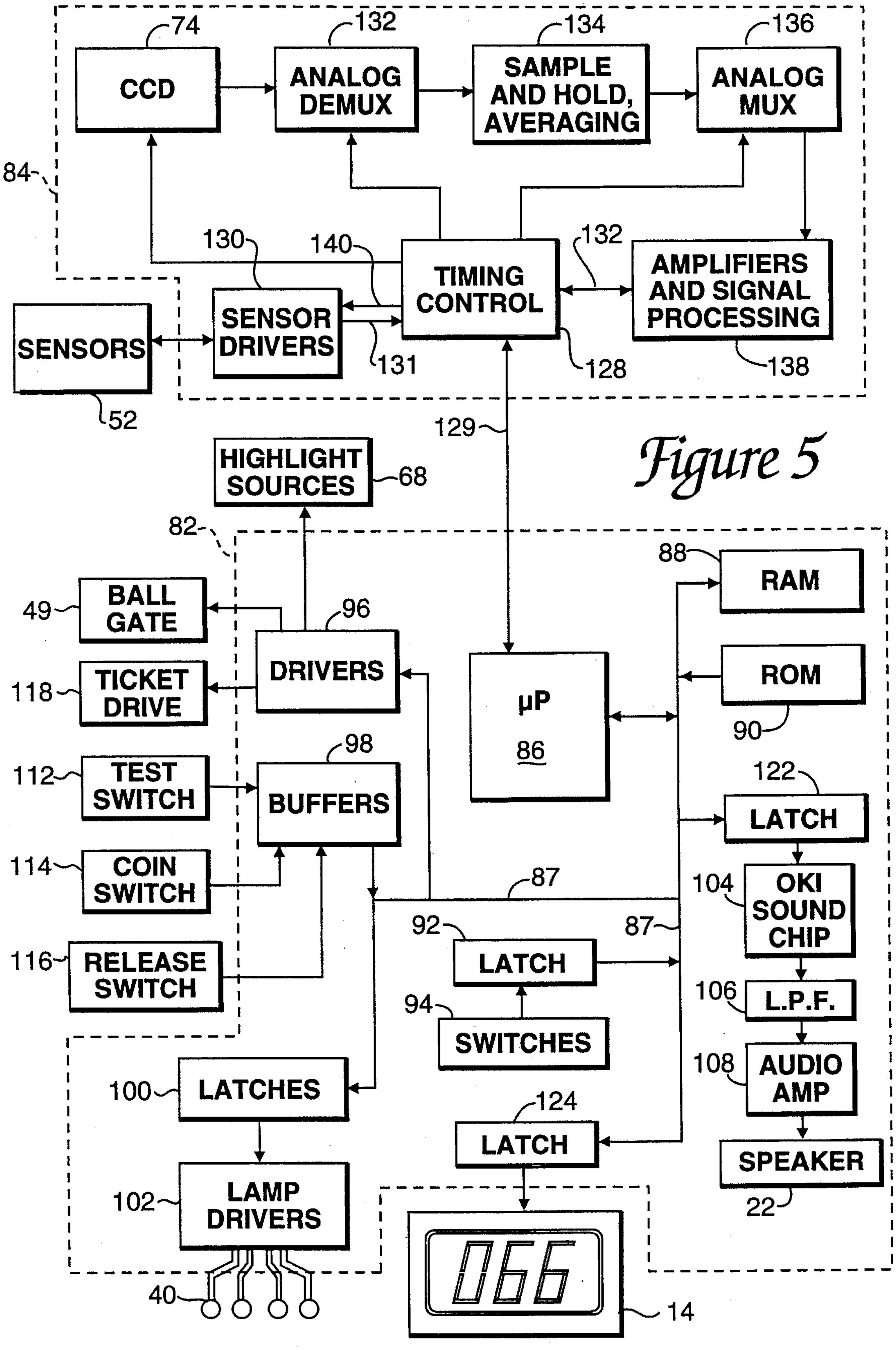
FIG. 5 is a schematic diagram of a controller for the present invention.

FIG. 5 is a block diagram of a control system 80 of game apparatus 10. As an example, printed circuit boards including the control system can be located behind the target section 16. The components of control system 80 include a main control board 82 and a ball sensor board 84. Main control board 82 includes a microprocessor 86, RAM 88, ROM 90, a latch 92, DIP switches 94, drivers 96, buffers 98, latches 100, lamp drivers 102, sound chip 104, low pass filter 106, audio amplifier 108, and speaker 24. The main control board 82 is also coupled to display section 14.

The microprocessor 86 is preferably an 8-bit microprocessor, such as the Intel 8031, which has the range of features adequate for the task, including eight data lines and sixteen address lines. The microprocessor 86 is coupled to ROM 90 by a data/address/control bus 87. The ROM 90 is preferably an erasable, programmable read-only memory (EPROM) that contains the start-up instructions and operating system for the microprocessor 86. Microprocessor 86 is connected to RAM 88 by bus 87 to permit the use of RAM for scratch-pad memory. Methods for coupling ROM 90 and RAM 88 to the microprocessor 86 by bus 87 including enable, address, and control lines are well-known to those skilled in the art.

The microprocessor 86 is also coupled to a latch 92 by the bus 87. The switches 94 coupled to latch 92 provide selectable functions that the operator of the game unit may change to his or her liking. These selectable functions include the modifiers to game score when a ball falls into a matching-colored highlighted target, when a ball falls into a matching-colored unhighlighted target, and when a ball falls into a unmatched colored target. In addition, functions such as sound effects, the amount of any award dispensed, the test mode, the type of game, and so on can be selected. Other selectable functions can also be set by the switches depending on how many selectable game options and features are desired.

The microprocessor 86 is also coupled to the drivers 96 and the buffers 98. The buffers 98 receive data from several switches, including the test switch 112, which activates a test mode for the game apparatus 10; coin switch 114, which detects if a coin has been inserted into the coin slot 18 of the front panel 12; and a playing piece release switch 116, which indicates to the microprocessor 86 if playing pieces have actually been dispensed to the player.

The drivers 96 activate output devices including the ticket drive 118, which activates the dispensing of an award (in this case, tickets) out of the award dispenser 20; the ball gate 49, which is preferably opened by solenoids to allow balls 26 to roll into the playing piece dispenser 24; and the highlight sources 68, which highlight specified target displays 36.

The microprocessor 86 is also coupled to latches 100, which latch data for the lamp drivers 102. The lamp drivers 102 supply power to the lamps 40, which include lights on the target section 16 and on other areas of the game apparatus 10 that are not part of the game score display 14. In the preferred embodiment, components such as the award dispenser 20 and lamps 40 are powered by a commercially available 110 V AC power supply and power converters, which are well known in the art.

The microprocessor 86 is also coupled to a sound chip 104 which can be, for example, an OKI Voice Synthesis LSI chip available from OKI Semiconductor of San Jose, Calif. that has eight data input lines coupled to the microprocessor 86 by a latch 122. The sound chip 104 can receive its data from ROMs (not shown) and preferably outputs sound data to a low pass filter 106, an audio power amplifier 108, and finally to the output speaker 22, which generates sounds to the player playing the game apparatus 10.

The microprocessor 86 is also coupled to display section 14. The bus 87 connecting the microprocessor 86 to the display section 14 is latched by a latch 124. Both the game score display 28 and the time display 30 are preferably 7-segment LED digit displays.

Ball sensor board 84 includes a timing control section 128, sensor drivers 130, a sensor device 74, an analog demultiplexer 132, a sample and hold/averaging section 134, an analog multiplexer 136, and an amplifier/signal processing section 138. Timing control section 128 is coupled to microprocessor 86 by a bus 129 and includes a microprocessor to control timing operations of the ball sensor board 84. A suitable microprocessor is the PIC16C71 manufactured by MicroChip, Inc. of Tex. Timing control section 128 also includes an oscillator and related components, such as GAL16V8A PLD's made by National Semiconductor of San Jose, Calif., to produce the clock signals required for the sensor device 74. Such components are well known to those skilled in the art.

Timing control section 128 is coupled to sensor drivers 130 by a clock line 131 used to provide a clock signal. Sensor drivers 130 include a driver for the emitters 54 of sensors 52 positioned in targets 32. The emitter driver receives the clock signal from timing control section 128 to pulse the emitters 54 on and off at the frequency specified by the clock signal.

Sensor drivers 130 also include a driver for the receivers 56 of sensors 52. A receiver 56 receives the pulsed radiation from an emitter 54 when a ball 26 falls into a target 32 and reflects the emitted radiation. Receiver 56 sends a pulsed signal to the receiver driver in block 130. A filter chip included in the sensor drivers 130 is coupled to the receiver driver and continuously monitors the receiver for a signal with the specified clock frequency. When a signal with the correct frequency is received, the filter chip sends a signal on line 140 to timing control section 128 which indicates to the timing controller that a ball has been detetected in a target 32. A suitable filter chip for use in the sensor drivers section 130 is the LM567 manufactured by National Semiconductor of California. Alternatively, the sensor can be implemented in other fashions, such as with a constant radiation (i.e. non-pulsed) sensor technology, as is well known to those skilled in the art.

Timing control section 128 is also coupled to sensor device 74, which in the preferred embodiment is a CCD as described with reference to FIG. 4. Once timing control section 128 receives a signal from sensor drivers 130 indicating that a ball has been detected in a target, timing signals are sent to activate sensor device 74 to scan for color in all of the targets 32. Sensor device 74 reads any light signals impinging on its photodetectors from guides 64 and outputs a serial analog signal on line 142.

A section of a preferred serial analog signal output by sensor device 74 is shown in FIG. 5a. Output signal 144 includes some framing pulses at the beginning and end of the frame. Signal 144 also includes 1560 separate analog pulses 146, one pulse for each of the single photodetector elements positioned on the sensor device 74. Each pulse 146 is representative of the amount of red, green or blue light (depending on the type of photodetector) received by a corresponding photodetector. A pulse's 146 amplitude indicates how intense a detected component of light is. For example, pulse 147 indicates that a relatively large amount of green light (i.e., about 480 to 580 nm wavelength) was received by photodetector element number 1555, while pulse 148 indicates that a relatively small amount of blue light was received by photodetector element 1556.

The output signal 144 from sensor device 74 is sent on line 142 to an analog time demultiplexer 132. The timing control section 128 uses control signals to demultiplex the pulses 146 known to be coupled to guides 64. For example, timing control section 128 counts the pulses of output signal 144 until a pulse 146 is output representing the output of photodetector element number 64. The next 12 pulses (elements 64–80) are known to be derived from guide 64*a*; these pulses are separated by the demultiplexer 132 into three separate color signals: red, green, and blue. The separated signals are then sent to sample and hold/averaging section 134 on 3-line bus 150.

The sample and hold/averaging section receives three separate signals representing red, green, and blue color components, respectively. The signal levels are held and averaged (integrated) over the four pulses of data for each component (12 pulses total). An average level for each of the color components results from the integrating operation. The sample and hold/averaging functions are accomplished with op amps and capacitors, as well known to those skilled in the art.

The three averaged color components are sent to analog multiplexer 136, which combines the three signals into a single serial output signal using control signals from timing control section 128. The multiplexed signal is then sent to amplifier and signal processing section 138, which conditions the signal with op amps and sends the signal to timing control section 128.

Timing control section 128 receives the averaged analog signal on line 152 and passes the signal through an analog to digital converter (ADC) included in the timing control section. The levels of the red, green and blue color components are preferably digitized to an 8-bit resolution and are stored by the timing controller as three digital numbers.

The timing control section 128 then waits for and controls the processing of the next 12 pulses in the output signal 144 which are derived from the next guide 64*b* (element numbers 520 to 531). The pulses in between the desired sets of 12 pulses are ignored and allow time for the desired sets of pulses to be processed. The next set of 12 pulses are processed similarly to the first 12 pulses described above and stored by the timing control section as three digital numbers representing red, green and blue levels. Each set of three digital RGB numbers represents the colors detected from a single target 32. Obviously, one set of RGB numbers will have much greater values than the other sets. This one set of greater numbers is derived from the target that actually received the ball. The timing control section thus knows the specific target 32 that ball 26 fell into and that target's associated color from the order of the data received from the sensor device 74.

Once all the sets of pulses are stored as RGB numbers (4 sets of numbers representing four targets in the preferred embodiment), 5–7 more entire frames of data 144 are processed to find the highest (i.e. peak) level of RGB components detected by the sensor device 74. Since a ball 26 moves right by a guide 64 in a target 32, the detected light reflected from the surface of ball 26 tends to increase to a peak value as the ball moves closer to the guide, then decrease as the ball moves away.

Once the peak RGB components are found by the timing control section 128, they are sent to the microprocessor 86 over bus 129. Timing control section 128 also sends information to microprocessor 86 indicating the color of the target that the ball 26 was received by. Microprocessor 86 receives the RGB numbers from timing control section 128 and calculates a ratio between these components to determine the color of the detected ball 26.

FIG. 5*b* is a graph 160 showing the digitized red, green, and blue components for ball colors used in the preferred embodiment. Only the ratio between these RGB levels is needed to distinguish between different colors. The microprocessor looks for a range of ratios to determine the color of a ball. For example, a ball with a light shade of red and a ball with a dark shade of red might have slightly different ratios between the red, green, and blue light components; however, the ratios are close enough in value for the microprocessor to categorize the color of both of the balls as "red". A range of ratios is determined for each of the colors used in the game.

Once the ball color is determined, microprocessor 86 determines if the ball color matches the target color. The microprocessor further checks if the target in which the ball was detected is currently being highlighted by highlighting means 68. The microprocessor then changes the game score according to specified conditions. In the preferred embodiment, if the ball color matches the receiving target's color, and the receiving target is currently highlighted, then the microprocessor adds a number of points to the game score. If the ball and receiving target colors match but the receiving target is not currently highlighted, the game score is not changed. If the ball and receiving target colors do not match, a number of points could be subtracted from the game score. In an alternate embodiment, the game score can be changed differently; for example, a reduced amount of points can be added to the game score in the case where the ball and target colors match but the target is not highlighted.

The preferred embodiment of the control system 80 operates briefly as follows. The microprocessor 86 first reads the low memory from ROM 90 over bus 87 and sequences through the software instructions stored in ROM. The settings of DIP switches in the switches block 94 are also read into the microprocessor. The software from the ROM 90 then instructs the microprocessor 86 to send and receive data over the bus 87 in order to conduct a game. For example, when the coin switch 114 is activated, indicating a coin has been inserted into coin slot 18, the microprocessor reads the "coin inserted" signal from the buffers 98 on bus 87. The microprocessor then sends a signal to the drivers 96 in order to open the ball gate 49 and release the balls for the player's use. The microprocessor then sends a signal to drivers 96 to highlight a target display 36 for a predetermined interval of time. A target display can be selected to be highlighted according to a pattern, or in random fashion. Once the highlighting time interval is over, a different target is highlighted.

The timing control section then waits for a signal from sensors 52 that indicate which target 32 a ball 26 falls into. Once a ball is detected in a specific target by sensors 52, sensor drivers 130 send a signal to the timing control section 128. The timing control section 128 signals the sensor device 74 to scan the color of the received ball. The signal indicating the ball's color is averaged, amplified, and converted to a digital signal, which is sent to microprocessor 86. A signal indicating the color of the target that received the ball is also sent to the microprocessor. The microprocessor compares the colors of the ball and the receiving target to determine if they match, and also checks if the receiving target is highlighted. The microprocessor then updates the game score and the game score display by sending a signal to display section 14.

The microprocessor also counts down a predetermined time interval from the start of the game, which is preferably about thirty seconds. Once the time interval is over, the microprocessor sends a signal to drivers 96 to close the ball gate 49. The microprocessor continues reading the target sensors and changing the game score until a new coin is deposited, indicating a new game and a reset game score. Alternatively, once the ball gate 49 is closed, the microprocessor waits another predetermined time interval for the player to throw any remaining balls and then stops modifying the game score. During game play, the microprocessor sends appropriate output signals over bus 87 to activate speaker 24 and lamps 40 whenever game action occurs, such as when a ball falls into a target, the color of a ball matches a receiving target, or the game is over.

The operation of the preferred embodiment of the game apparatus may be briefly described as follows: A player deposits a coin or token into coin slot 18 of game apparatus 10 to start the game. The microprocessor opens ball gate 49, which releases balls 26 into playing piece dispenser 24 for the player's use. The microprocessor then highlights a target or targets. The player views the targets to see which target(s) is highlighted, and tries to toss a ball having the same color as the highlighted target into the highlighted target. The microprocessor senses ball color, receiving target color, and target highlight status to adjust the game score accordingly. Tossed balls return back to the playing piece dispenser 24 through passage 46 and/or opening 38 until a time limit has expired. Once the time limit expires, the microprocessor doses ball gate 49 and stops changing the game score. The player may still be holding some balls at this point, but they will not affect the game.

Once the game is over, the microprocessor activates award dispenser 20 to dispense an award based upon the game score. For example, if the final game score is 20, 20 tickets could be dispensed to the player. Alternatively, microprocessor 86 can activate award dispenser 20 each time the player scores points, so that awards are dispensed continuously during game play.

Figure 6A:
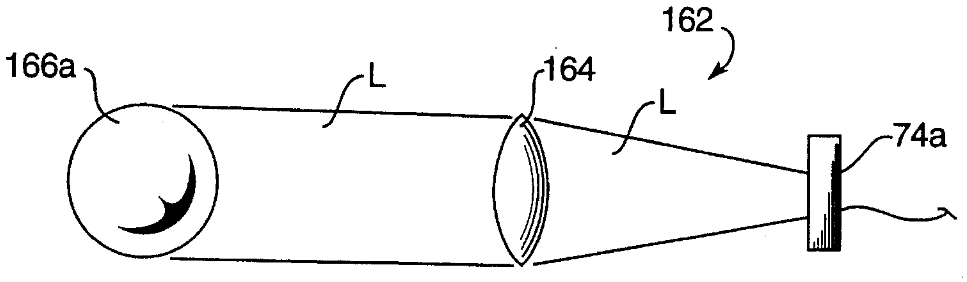
FIGS. 6*a* and 6*b* are two alternate embodiments for a color sensor in accordance with the present invention.

In FIG. 6*a*, an alternate embodiment 162 for a color sensing assembly is shown. In this alternate embodiment, a lens 164 is used in place of the fiber optic cable described previously to direct light L reflected from an object 166*a* onto a detector 74*a*. As before, the detector 74*a* is preferably a CCD, such as TDC136C-2 of Toshiba of Japan. This embodiment 162 is particularly useful for objects 166*a* which are moving in freely in space. By "space" it is meant that the object moves in three-dimensions in an unencumbered fashion, and includes movement in air, vacuum, and various fluid medium. For example, the embodiment 162 could be used to determine the color of a ball in flight.

Figure 6B:
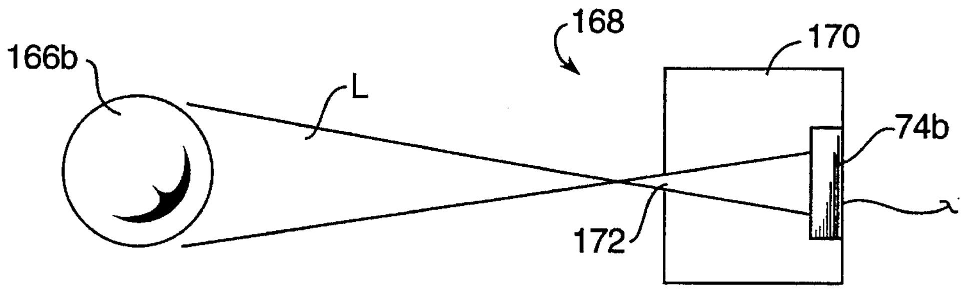

FIG. 6*b* illustrates another embodiment 168 for a sensing assembly in accordance with the present invention. In this embodiment, an enclosure 170 having a small aperture 172 acts as a lensless camera or camera obscura to direct light L from an object 166*b* onto a detector 74*b*, which again is preferably a CCD. This embodiment is also useful for determining the color of objects moving in space.

Of course, there are other equivalent optical methods for directing light from an object to a CCD in accordance with the present invention. Also, other detectors than CCD's are suitable for detecting colors.

Figure 7:
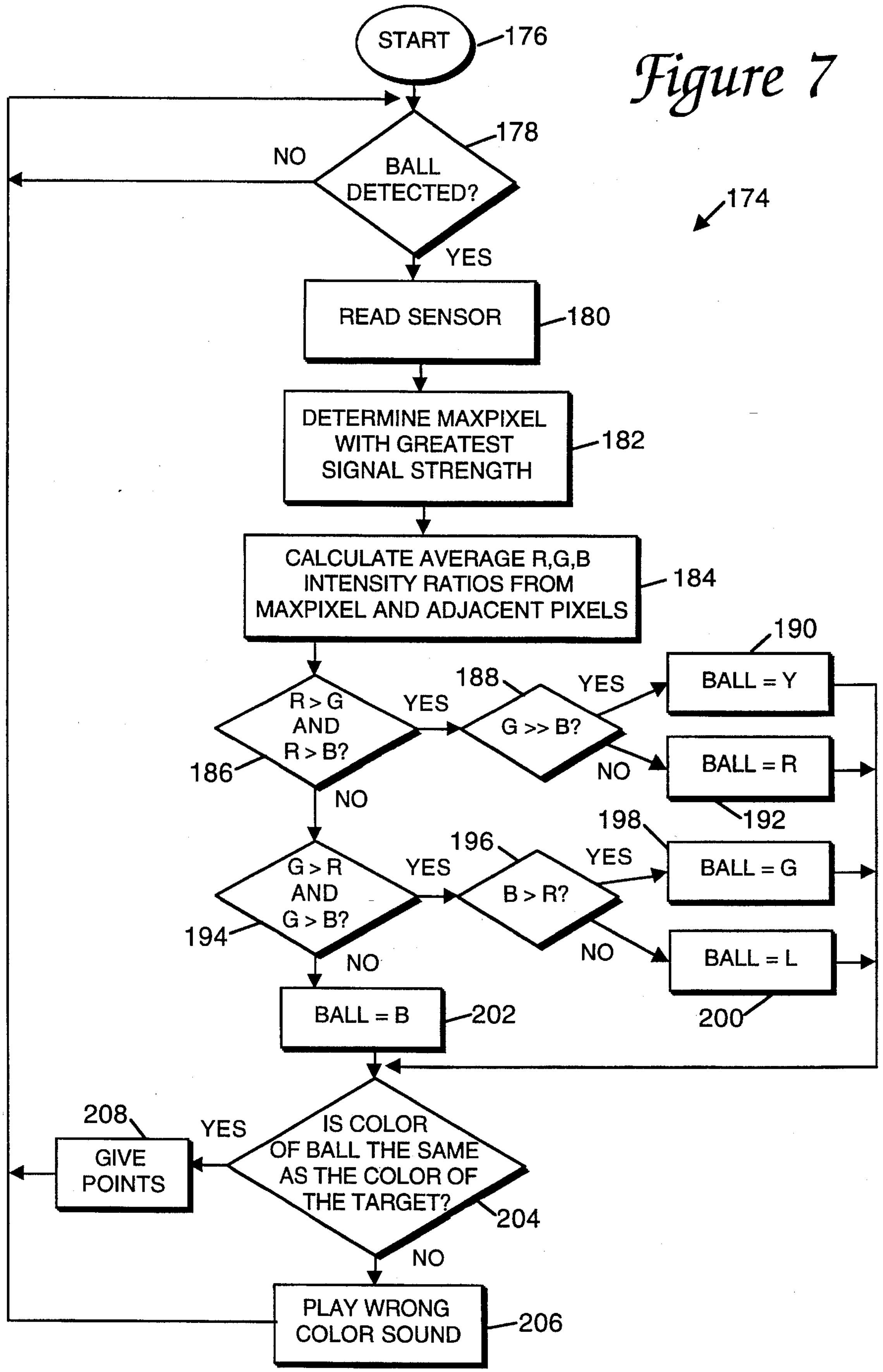
FIG. 7 is a flow diagram of a computer implemented process for determining color of an object in accordance with the present invention.

In FIG. 7, a computer-implemented process 174 in accordance with the present invention begins, at power-up, at 176 and, in a decision step 178, it is determined whether a ball has been detected, such as by sensor 52 of FIG. 3. Next, in a step 180, the CCD sensor 74 is "read." To read sensor 74, the pixels are scanned and an analog-to-digital (A/D) conversion is made to create an array of data representing the signal strength or "intensity" of each of the pixels 75 of the sensor 74. In the present embodiment, a digital value of 0 indicates a maximum or most intense signal strength, while a digital value of 255 indicates the absence of any signal from a particular pixel. Next, in a step 182 it is determined which pixel for each group of pixels associated with a fiber optic cable has the greatest signal strength, i.e. which pixel MAXPIXEL is closest to having a digital value of 0.

In step 184, the average red (R), green (G), and blue (B) intensity ratios from the pixel MAXPIXEL and from adjacent pixels. This process has been described previously. Next, in a decision step 186, it is determined whether the red average R is greater than both the green average G and the blue average B. If so, a step 188 determines whether the green average G is much greater than the blue average B. For example, G will be determined to be much greater than B if the ratio of G/B is greater than 5–10%. If step 188 determines that G>>B, then step 190 assigns the value yellow (Y) to the variable BALL. If step 188 determines that G is not much greater than B, then step 192 assigns the value red (R) to the variable BALL.

If step 186 determines that red is not the predominant color, a step 194 determines whether the green average G is greater than both the red average R and the blue average B, then a step 196 determines whether B > R. If it is, the variable BALL is assigned the value green (G) in a step 198, and if it is not, the variable BALL is assigned the value lime (L) in a step 200.

If steps 186 and 194 determine neither red (R) nor green (G) are predominant, then it is assumed in a step 202 that blue (B) is predominant. Next, in a step 204, it is determined whether the color of the ball, i.e. the color stored in the variable BALL, is the same color as the color of the target. The color of the target is known to the process 174 by means of the controller of the process. If the color of the ball is not the same as the color of the target, a step 206 plays a "wrong color" sound to provide feedback to the player that the wrong color ball was played. If the color of the ball is the same as the color of the target, a step 208 increases the player's points to reward a proper play. The process then repeats itself beginning with step 178.

As is apparent from the proceeding descriptions, the color sensing method and apparatus of the present invention are applicable to a variety of game apparatus. In general, a game with a color sensing apparatus of the present invention has a plurality of playing pieces, each of which is at least one of two distinct colors. The game has at least one mechanism for receiving one or more playing pieces, and a mechanism allowing a player to affect the relative position of a playing piece and the mechanism for receiving a playing piece. The game further includes a mechanism for determining a color of a playing piece received by he mechanism for receiving a playing piece. The scoring of the game is at some point dependent upon the color and position of a playing piece, either at the end of the game or at some time during the game.

Figure 8:
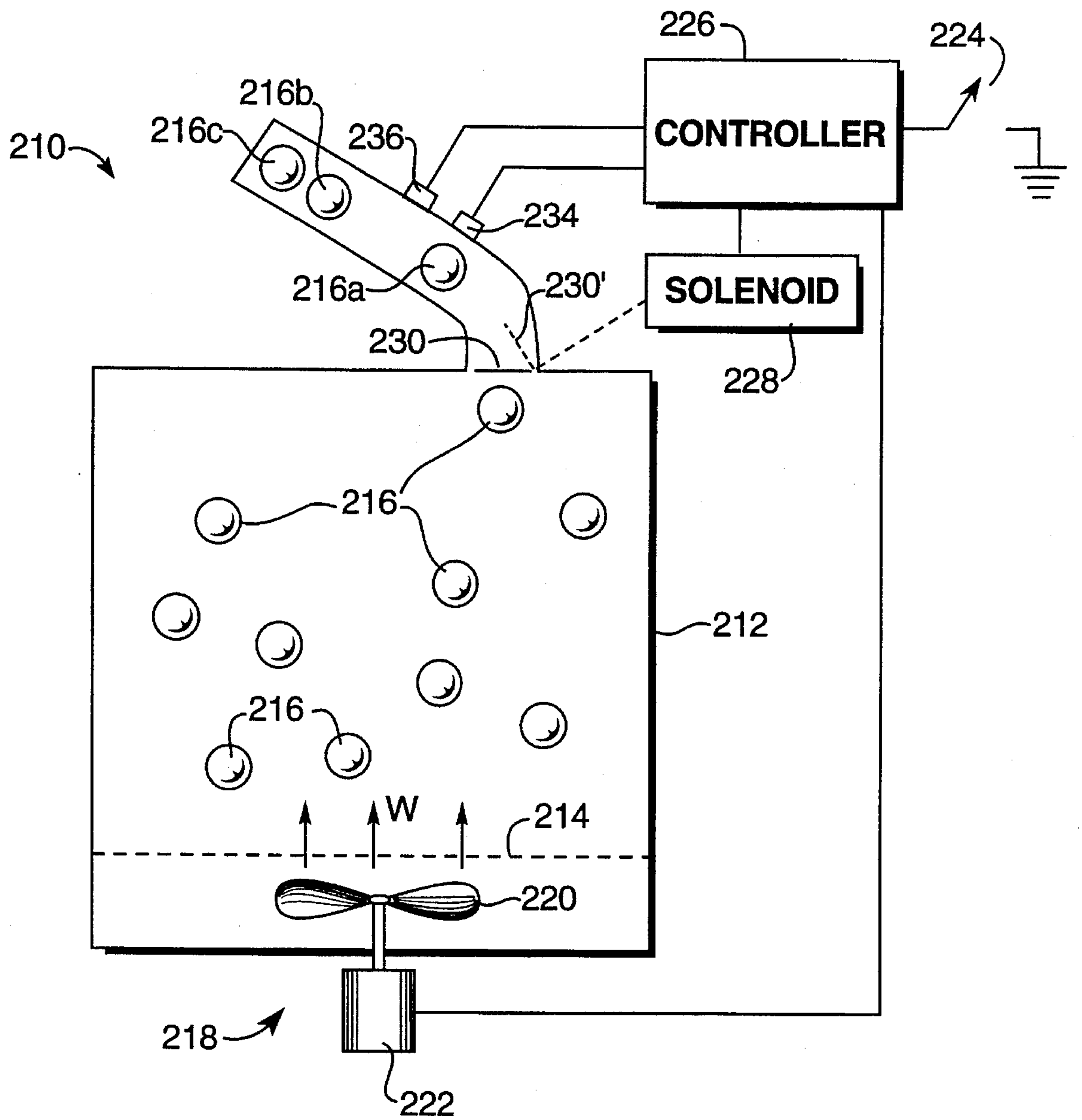
FIG. 8 is a pictorial representation of a first alternative game in accordance with the present invention.

An example of an alternative game 210 in accordance with the present invention is illustrated in FIG. 8. The game 210 includes a transparent enclosure 212 having a perforated floor 214 and a number of colored PING-PONG balls 216. A fan 218 including fan blades 220 connected to a shaft of a motor 222 causes a wind W which blows bails 216 substantially randomly around within enclosure 212. A user (player) can activate a switch 224 which is detected by a controller 226 to activate an electrical solenoid 228. The solenoid is operative to open a door 230 to an open position 230' to allow a ball, such as ball 216*a*, to enter a tube 232. The tube 232 can collect a number of bails, as indicated at 216*b* and 216*c*. After the switch 226 is released by the player, the door 230 returns to its closed position. As a ball, such as ball 216*a*, passes a first sensor 234, the controller is signaled that a ball has entered the tube. The controller 226 then determines the color of the ball by a color sensor 236 in accordance with the present invention. The score of the game can be modified depending upon the color of the ball and the color of any balls which may have preceded it in the tube 232.

Figure 9:
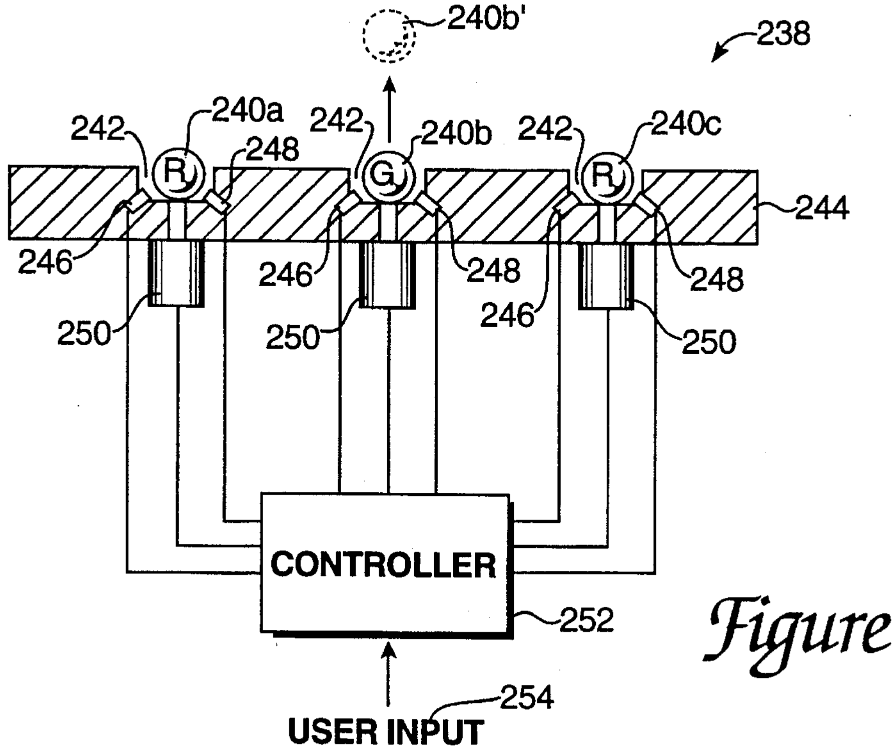
FIG. 9 is a pictorial representation of a second alternative game in accordance with the present invention.

An example of yet another alternative game 238 is illustrated in FIG. 9. In this game, a number of colored balls 240*a*, 240*b*, and 240*c* are received within holes 242 of a playing field 244. Other holes can be provided in the playing field to form a rectilinear matrix of holes 242 in the playing field. Each hole 242 has a ball sensor 246, a color sensor 248, and a solenoid 250 coupled to a controller 252. The ball sensor 246 and color sensor 248 are preferably implemented as described previously. A user input 254 causes the controller to activate the solenoid(s) 250 associated with colored balls 240 which correspond in color to the user input. For example, if balls 240*a* and 240*c* are red, and ball 240*b* is green, and if the user input 254 is "green", then the controller would activate the solenoid 250 associated with the ball 240*b* to cause the ball 240*b* to eject from its hole 242 as indicatedon phantom at 240*b*'. The controller would, of course, know the color of each ball 240 by means of the color sensor 248 in each hole 242.

While this invention has been described in terms of several preferred embodiments, it is contemplated that alterations, modifications and permutations thereof will become apparent to those skilled in the art upon a reading of the specification and study of the drawings It is therefore intended that the following claims include all such alterations, modifications and permutations as fall within the spirit and scope of the present invention.

What is claimed is:

1. A color sensing apparatus comprising:

a charge coupled device including a plurality of light sensitive pixels, said charge coupled device developing an output signal based upon the color and intensity of light impinging upon at least one of a plurality of subsets of said plurality of light sensitive pixels;

a plurality of separate guides for directing light including red, green, and blue wavelength ranges, wherein each guide is operative to direct light to an associated one of said subsets of said pixels such that each subset receives light from only said associated guide, wherein each of said subsets includes pixels predominantly sensitive to a red wavelength range of light, pixels predominantly sensitive to a green wavelength range of light, and pixels predominantly sensitive to a blue wavelength range of light; and an apparatus for determining the predominant color of said light detected by each of said subsets from said output signal of said charge coupled device.

2. A color sensing apparatus as recited in claim 1 wherein said charge coupled device includes a regular pattern of said pixels predominantly sensitive to said red, green, and blue wavelength ranges of light.

3. A color sensing apparatus as recited in claim 1 wherein each guide for directing light comprises an optic cable.

4. A color sensing apparatus as recited in claim 1 wherein each guide for directing light comprises a lens.

5. A color sensing apparatus as recited in claim 1 wherein each guide for directing light comprises an aperture.

6. A color sensing apparatus as recited in claim 3 wherein said apparatus for determining the predominant color comprises a computer having an input responsive to said output signal of said charge coupled device and a computer implemented process running on said computer to analyze said output signal.

7. A color sensing apparatus as recited in claim 1 wherein said apparatus for determining the predominant color of said light includes means for averaging red, green, and blue intensities of said red, green, and blue wavelength ranges of light found in said output signal to help determine said predominant color.

8. A color sensing apparatus as recited in claim 7 wherein said apparatus for determining the predominant color of said light includes an apparatus for determining ratios between said average red, green, and blue intensities found in said output signal to determine said predominant color.

9. A color sensing apparatus as recited in claim 1 wherein each of said plurality of separate guides directs said light from a different source of said light.

10. A color sensing apparatus as recited in claim 7 wherein said apparatus for determining the predominant color of said light compares said average red, green, and blue intensities to ranges of predetermined intensities to determine said predominant color, wherein said ranges of predetermined intensities only correspond to particular predetermined colors that are desired to be sensed by said color sensing apparatus.

11. A method for determining the color of an object comprising the steps of:

(a) sensing light from an object with a plurality of light sensitive pixels, wherein a plurality of said pixels are predominantly sensitive to red light, a plurality of said pixels are predominantly sensitive to green light, and a plurality of said pixels are predominantly sensitive to blue light;

(b) calculating an average red (R) intensity of said light sensed by said plurality of pixels sensitive to said red light, an average green (G) intensity of said light sensed by said plurality of pixels sensitive to said green light, and an average blue (B) intensity of said light sensed by said plurality of pixels sensitive to said blue light;

(c) performing said steps (a) and (b) a plurality of times to provide a plurality of sets of averaged R, G, and B intensities and selecting the maximum set of said averaged R, G, and B intensities; and (d) determining relationships between said average R, G, and B intensities of said selected set and comparing said relationships to a set of predetermined relationships to determine a predominant color of said object.

12. A method as recited in claim 11 further comprising the steps of:

determining a pixel having a maximum intensity of said plurality of light sensitive pixels, wherein said plurality of pixels include said pixel having a maximum intensity and pixels adjacent to said pixel.

13. A method as recited in claim 11 wherein said step of determining relationships between average R, G, and B intensities includes the step of determining the maximum average intensity among said average R, G, and B intensities.

14. A method as recited in claim 13 wherein said step of determining relationships between average R, G, and B intensities includes the step of comparing the remaining average intensities of said R, G, and B intensities after the maximum average intensity has been determined.

15. A method as recited in claim 11 wherein said step of calculating the average intensities of said light includes calculating average R, G, and B intensities for a plurality of subsets of light sensitive pixels, wherein each of said subsets of pixels is operative to only sense light guided to said subset by a different source of said light.

16. A method as recited in claim 15 further comprising the steps of:

performing said steps (a) and (b) for each of said plurality of subsets of pixels to produce a set of average R, G, and B intensities for each of said subsets of pixels;

determining which one of said subsets of pixels has detected said object an by determining the maximum set of average R, G, and B intensities of said sets of average R, G, and B intensities.

17. A method as recited in claim 16 further comprising a step of converting analog signals of said R, G, and B intensities to corresponding digital signals before said step (d).

18. A method as recited in claim 11 wherein said step (d) includes determining ratios between said average R, G, and B intensities and comparing said ratios to a set of predetermined ratios to determine a predominant color of said object.

19. A method as recited in claim 18 wherein said predetermined ratios includes a range of predetermined ratios corresponding to possible colors of said object, wherein when said determined ratio between said average R, G, and B intensities falls within a particular one of said predetermined ranges of ratios, said predominant color of said object is determined to be said color corresponding to said particular one of said ranges of ratios.

20. A color sensing apparatus comprising:

a charge coupled device including a plurality of light sensitive pixels;

a guide operative to direct light including red, green, and blue wavelength ranges from a source of said light to a subset of said pixels, wherein said subset includes pixels predominantly sensitive to a red wavelength range of light, pixels predominantly sensitive to a green wavelength range of light, and pixels predominantly sensitive to a blue wavelength range of light; and an apparatus for determining the predominant color of said light from an output of said charge coupled device, said apparatus determining said predominant color by receiving a plurality of sets of red, green and blue wavelength range intensities detected by said pixels of said subset over a period of time and selecting a set of said red, green, and blue range intensities having a maximum value for use in determining said predominant color.

21. A color sensing apparatus as recited in claim 20 wherein said light guide comprises a fiber optic cable.

22. A color sensing apparatus as recited in claim 20 wherein said light guide comprises a lens.

23. A color sensing apparatus as recited in claim 20 wherein said apparatus for determining the predominant color comprises a computer having an input responsive to said output signal of said charge coupled device and a computer implemented process running on said computer and analyzing said output signal.

24. A color sensing apparatus as recited in claim 20 further comprising a plurality of separate guides and a plurality of subsets of said pixels, wherein each of said guides directs light including red, green, and blue wavelength ranges to a corresponding unique subset of said pixels, wherein each of said subsets receives light from only one of said guides.

25. A color sensing apparatus as recited in claim 20 wherein said apparatus for determining the predominant color of said light includes a device for averaging intensities of said red, green, and blue wavelength ranges of light to determine said predominant color.

26. A color sensing apparatus as recited in claim 25 wherein said apparatus for determining the predominant color of said light includes a mechanism for calculating ratios between said average red, green, and blue intensities and comparing said ratios to a set of predetermined ratios to determine said predominant color of said object.

27. A method for detecting an object and determining the color of the object comprising the steps of:

(a) sensing light from a plurality of guides of light with a plurality of light sensitive pixels, wherein each of said guides provides light to an associated subset of said pixels such that each subset receives light only from said associated guide, and wherein a plurality of said pixels in each of said subsets are predominantly sensitive to red light, a plurality of said pixels in each of said subsets are predominantly sensitive to green light, and a plurality of said pixels in each of said subsets are predominantly sensitive to blue light;

(b) for each of said subsets of pixels, calculating an average red intensity of said light sensed by said plurality of pixels sensitive to said red light, an average green intensity of said light sensed by said plurality of pixels sensitive to said green light, and an average blue intensity of said light sensed by said plurality of pixels sensitive to said blue light;

(c) examining said average red, green, and blue intensities in each of said subsets to determine which subset detected said object and to determine a predominant color of said detected object.

28. A method as recited in claim 27 wherein said step (c) includes determining ratios between said average red, green, and blue intensities and comparing said ratios to a set of predetermined ratios to determine a predominant color of said object.

29. A method as recited in claim 28 wherein said predetermined ratios includes a range of predetermined ratios corresponding to possible colors of said object, wherein when said determined ratio between said average red, green, and blue intensities falls within a particular one of said predetermined ranges of ratios, said predominant color of said object is determined to be said color corresponding to said particular one of said ranges of ratios.

30. A method as recited in claim 27 further comprising the steps of:

performing said steps (a) and (b) a plurality of times to provide a plurality of sets of averaged red, green, and blue intensities for each of said subsets of pixels; and determining the maximum average red, green, and blue intensities of said plurality of sets of average red, green, and blue intensities, wherein said maximum average red, green and blue intensities are provided to step (c).

* * * * *